Patented Dec. 25, 1934

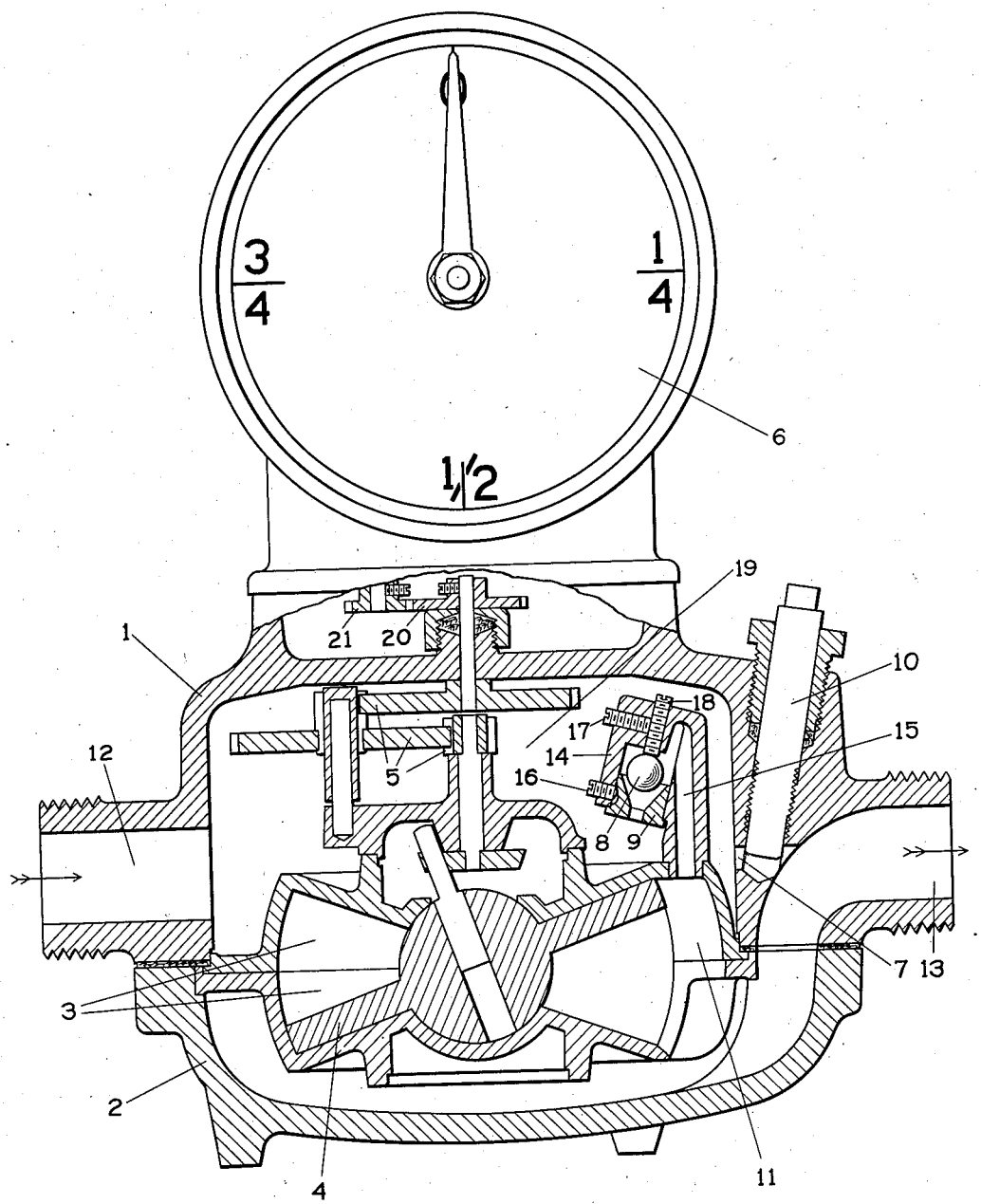

1,985,397

UNITED STATES PATENT OFFICE 1,985,397

LIQUID METER

Robert S. Bassett, Buffalo, N. Y.

Application November 5, 1932, Serial No. 641,374

8 Claims. (Cl. 73—98)

My invention relates to improvements in calibrating liquid meters in which an indicator is driven by a liquid operated mechanism and more particularly to those meters in which the working joints of a semi-positive liquid operated mechanism are kept semi-tight by a film of liquid retarded in its passage through said working joints by capillary attraction or what is commonly called liquid packing.

This liquid packing is subject to displacement by the surrounding liquid which is being measured. This results in a slight difference in the percentage of accuracy in a semi-positive meter at the low rate test flow and high rate test flow. This difference in accuracy, however, is only a fraction of 1% and is not to be confused with the characteristic fluctuation in accuracy of a turbine type meter which does not have liquid packed joints but in the usual form consists of a worm which is caused to rotate by the passage of liquid along through a casing surrounding the worm. In meters of the turbine type the variation on different rates of flow is as high as 5% and turbine type meters within a more restricted range of flow are not expected to register closer than within 3%. My invention applies only to meters of the semi-positive type where there is a drive on the liquid operated mechanism which is almost absolutely positive. The slippage or displacement of the liquid packing, as previously stated amounts to only a fraction of 1% but it is this small amount that is accounted for in the compound calibrating device shown in my invention which allows meters to register within ¼%, an impossible accuracy to be expected of a turbine type meter. A full positive meter must have working joints packed with leather cups or piston rings which creates a large amount of friction between the moving piston and the piston walls. This soon causes wear of the piston wall with the result that a full positive meter when handling non-self-lubricating liquids, such as gasoline, soon becomes worn and after a few months' service is much less accurate than a semi-positive meter which has a film of liquid in the working joints instead of a rubbing contact.

The object of my invention is to provide means to compensate for the variation in liquid flowing through the above mentioned working joints of the liquid operated mechanism at different rates of flow, by providing a calibrating device or compensating by-pass which will pass liquid around the driven member of the liquid operated mechanism to a maximum extent when the flow through said mechanism is so high that there is considerable differential in pressure existing between the inlet and outlet passages leading to said mechanism, and to a minimum or negligible extent when the flow through said mechanism is so low that there is a negligible differential in pressure existing between the inlet and outlet passages leading to said mechanism.

The liquid in the liquid packed joints is displaced at approximately the same rate under the two above flow conditions. This displacement of liquid will be considered as a leakage in this specification. At the low rate test flow this leakage is a greater percentage of the total flow through the meter than it is at the high rate test flow, this being a characteristic of a semi-positive meter. It is desirable, therefore, to introduce a calibrating or compensating device which will act as a by-pass at the high rate test flow to increase the total slippage or leakage so that the proportional leakage at the high rate test flow will be the same percentage of the total flow as at the low rate test flow on which the meter will be adjusted and calibrated.

My invention provides for a method of calibrating the meter at a certain selected low rate test flow and a second calibration device, working in conjunction with the first one, by which the meter may be again given an exact calibration at a higher rate of flow if it is found that after calibrating for the low rate test flow there is a slight difference in the registration of the meter at the higher rate of flow, a condition which is to be expected in a semi-positive type meter. This dual adjustment is novel and in actual practive has proved to be very important. By my device the slippage or leakage can be kept in the same proportion at two different rates of flow as there are two adjustments, one for each of the two rates of flow on which a meter is usually tested. My invention has proved especially valuable in use of gasoline meters of the retailing type where tests are run at 3 and 15 gallons per minute. Until my invention there was no method of providing two separate adjustments for the two separate test flow rates to give extremely close calibration of the meter within a fraction of 1%. Formerly an effort to do this was made by cutting down the slippage or leakage to a minimum so that the variation in the proportional leakage would not be noticeable in the registration of the meter. With my device it is not necessary to cut down this leakage to a very low point but it may be maintained at a constant amount of approximately 1% which has been found advisable so that the working parts of the liquid operated measuring mechanism can have sufficient clearance so that small particles of grit, hairs and other foreign matter will not clog the mechanism.

In my drawing the figure shown is a central, vertical, longitudinal view of my improved liquid meter showing the outside of the indicator and showing a section through the meter body through the interior parts as they are placed in and on the meter body. The outer casing of the meter is composed of two detachable parts, top casing 1 and bottom casing 2 which may be held together by conventional means which are not shown. Semi-positive liquid operated measuring mechanism 3 is supported within the outer casing and in the drawing is shown of the well known nutating disc piston type, 4 is the piston or driven member. Measuring mechanism 3 is operatively connected to registering indicator 6 by connecting means 5 which is shown as a train of spur gearing of the customary type. 20 is a meter change gear driven by connecting means 5 and driving indicator change gear 21. By varying the number of teeth on these two change gears the gear ratio can be changed so that the indicator 6 will register within very close limits the volume units of liquid passed by the meter. This method of driving the indicator by means of two change gears, which can be furnished in a series of ratios at close intervals to each other, is old and customary in liquid meter design and need not be explained farther. 7 is a by-pass passageway around measuring mechanism 3. On this is mounted the low rate test flow calibrating valve 10 which is shown of customary needle valve type construction and which controls the flow through the by-pass passageway or duct 7. When the meter is tested in the test room of the manufacturer meter change gear 20 and indicator change gear 21 are selected so that the meter will register closely to absolute accuracy. Calibrating valve 10 is set approximately one-half open during the previous mentioned test. After the change gears have been selected the meter is again tested, all in customary manner, at the low rate test flow which in gasoline retailing meters for use in filling automobiles is approximately 3 gallons per minute. If the meter registers more than actually passes through the valve 10 is opened slightly so as to pass more liquid for the same movement of the indicator and vice versa if the meter passes more than is shown by the indicator, all as is usual with calibrating valve procedure. There is nothing novel in the construction of calibrating valve 10 except that it is set when the meter is operated at the low rate test flow rather than being set when the meter is operated at full flow. This adjustment is new and novel and not heretofore possible.

It is possible, however, to construct change gears 20 and 21 in such a manner that the series of ratios obtainable by varying the number of teeth are at such close intervals that the steps between such ratios are only a fraction of a percent. In such cases the adjustment at the low rate test flow is made entirely by means of selecting the proper change gears, in which case calibrating valve 10 is either omitted entirely or kept tightly closed. Such construction, however, is rather difficult and my invention may be considered to cover more particularly liquid meters in which there is a calibrating valve for calibrating the meter at the low rate test flow and required because of the fairly large jumps in the series of ratios which are obtained from a series of change gears of usual size and construction.

The novel feature of my invention is the provision of a secondary calibrating valve for use in giving a second adjustment on the meter at the high rate test flow, which in a gasoline meter of the size usually used in furnishing gasoline to automobiles is approximately 15 gallons per minute. This high rate test flow calibrating valve consists essentially of a weighted automatic throttling device which is shown as a ball 8 which co-acts with a seat 9 to open or close the high rate test flow calibrating valve. As shown in the drawing this automatic throttling device is essentially a vertically elongated chamber having its axis in a substantially vertical rather than a horizontal position. As indicated in the drawing seat 9 tapers from the central portion of this chamber toward the lower end of the chamber. Seat 9 is shown removable for the positioning and removal of ball 8 which as shown is movably disposed above seat 9 for alternate cooperation with seat 9 and locking stem 18. The force of gravity tends to seat ball 8 on seat 9 and the fluid moving through the by-pass duct 15 tends to force ball 8 off seat 9 and up against locking stem 18. The rate of flow through the meter in this way accordingly is controlling the passage of liquid through by-pass duct 15. While operating at the minimum flow ball 8, which is the valve member, will rest on seat 9 preventing any by-passing of liquid through by-pass duct 15. At intermediate and maximum flow rates ball 8 will be held in suspension against locking stem 18. When ball 8 is against locking stem 18 it restricts the flow of liquid through by-pass duct 15 to a slight extent as compared with the flow when ball 8 is midway between its position on seat 9 and its upper position against locking stem 18. This is because ball 8 when in its upper position approaches the outlet opening from the throttling device into by-pass duct 15 causing a slight throttling action. Another novel feature is the location of the automatic throttling device as shown in the drawing on top of the semi-positive liquid operated measuring mechanism 3 but enclosed by top casing 1. This construction is far superior to competing constructions locating and automatic throttling device inside the measuring mechanism chamber or in the wall of the casing casting. At flows between the minimum flow and the intermediate flow ball 8 after displacement from its lower position on seat 9 rolls up the tapered side of seat 9 to a position determined by the upward pressure of the liquid against ball 8. The ball is, therefore, supported by seat 9 to some extent at positions other than the closed position. This support tends to eliminate a vibrating fluctuation in the opening through the automatic throttling device and is far superior to a spring loaded check valve or an ordinary gravity operated check valve with no contact between the valve member and the seat except at the closed position. In order to obtain the fullest advantages of this construction the drawing shows the axis of the chamber of the automatic throttling device in a substantially vertical position but, nevertheless, preferably at a slight angle from the vertical so as to obtain a more secure support for ball 8 during its intermediate positions between the upper and lower points of travel. As shown in the drawing a suitable construction is with a threaded stem 18 which can be screwed in or out of body 14 to control the amount that the valve will open at its maximum, or in other words to determine the limit of opening of the automatic throttling device. 17 is a locking means for locking stem 18 and 16 is a holding means for securing seat 9 within body 14. 15 is a by-pass or by-pass duct around the liquid operated piston. 12 is the inlet passage which leads into the body of the meter. 19 is the passage within the meter itself which is directly connected to inlet passage 12 and which is, therefore, at the same pressure as existing in inlet passage 12. Similarly 13 is the outlet passage which leads from 11 which is a passage within the meter body directly connected to outlet 13 and under the same pressure as outlet passage 13. By-pass 15 is shown as connecting passage 19 with passage 11. Through these two passages by-pass 15 connects inlet passage 12 with outlet passage 13 so that the by-pass connects said inlet and outlet passages around liquid operated mechanism 3.

At the low rate test flow weighted ball 8 of the weighted automatic throttling device rests against seat 9 substantially stopping the flow through by-pass 15. This calibrating valve is, therefore, closed at the low rate test flow. As previously explained the meter is tested in the customary manner and the low rate test flow calibrating valve or device 10 is given its proper setting so that the meter will register with substantially perfect accuracy at the low rate test flow.

When the rate of flow is increased ball 8 lifts from its seat 9. At the high rate, test flow rate of flow it is first lifted from its seat by the differential in pressure between inlet passage 12 and outlet passage 13 and then forced further away from the seat by the flow through by-pass 15 until it is lifted upward against adjusting stem 18. In actual practice ball 8 has been found to shift slightly to one side or the other of stem 18 engaging the inner wall of body 14 but in any case its upward travel is limited by adjusting stem 18. When tested at the high rate test flow it may be found that the meter is passing more liquid than is shown by the indicator. In this case adjusting stem 18 will be screwed in to decrease the opening through the high rate test flow calibrating device, so that ball 8 is raised only slightly from seat 9. When tested at the high rate test flow and with adjusting stem 18 at a usual setting to allow ball 8 to rise somewhat from seat 9, it may be found that the meter is passing less liquid than is shown by the indicator. In this case adjusting stem 18 will be screwed out even more so that ball 8 when raised completely from seat 9 can move still farther from the seat so as to increase the opening through the high rate test flow calibrating device.

This dual adjustment is novel and radical as it allows a semi-positive meter to be adjusted at substantially absolute accuracy at two different points by means of the two co-operating calibrating valves. It is similarly novel to have a controlling stem or means for controlling the movement of the weighted automatic throttling device so that at its full opening the opening of the throttling device may be adjusted or calibrated.

It is also novel to have an automatic calibrating device of the type shown and arranged to close in opposition to the flow through it when used in conjunction with a second calibrating by-pass which is not throttled by the first automatic throttling device but which acts independent for calibrating the meter at the low rate test flow but which co-acts with it in determining the intentional leakage around the liquid operated mechanism at the high rate test flows.

Having thus described my invention what I claim as new and desire to secure by Letters Patent is:

1. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured; and a weighted automatic throttling device regulating the flow through said by-pass duct, arranged to close on low flows in opposition to the flow through said duct and to open on all high flows, and comprising a hollow chamber body, a weighted ball, a tapered valve seat co-acting with said ball, and adjusting means mounted on said body and controlling the upward limit of travel of said ball; substantially as and for the purpose described.

2. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured; a weighted automatic throttling device regulating the flow through said by-pass duct, arranged to close on low flows in opposition to the flow through said duct and to open on all high flows, and comprising a hollow chamber body, a weighted ball, a tapered valve seat co-acting with said ball, and adjusting means mounted on said body and controlling the upward limit of travel of said ball; a secondary by-pass duct adapted to pass around said mechanism a further portion of the liquid to be measured; and a secondary calibrating valve regulating the relative rate of flow through said secondary by-pass duct as compared with the rate of flow through said mechanism; substantially as and for the purpose described.

3. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured; and a weighted automatic throttling device regulating the flow through said by-pass duct, arranged to close on low flows in opposition to the flow through said duct, arranged to partially restrict the flow through said duct on high flows, arranged to have maximum opening at a flow between said low flows and said high flows, and comprising a hollow chamber body, a weighted ball, a tapered valve seat co-acting with said ball, and adjusting means mounted on said body and controlling the upward limit of travel of said ball; substantially as and for the purpose described.

4. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured; and a weighted automatic throttling device regulating the flow through said by-pass duct, arranged to close on low flows in opposition to the flow through said duct, arranged to partially restrict the flow through said duct on high flows, arranged to have maximum opening at a flow between said low flows and said high flows, and comprising a hollow chamber body, a weighted ball, a tapered valve seat removably mounted within said body and supporting said ball in its lower positions of opening, and means on said body controlling the upward limit of travel of said ball; substantially as and for the purpose described.

5. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured and mounted on said mechanism within said casing; and a weighted automatic throttling device regulating the flow through said by-pass duct, arranged to close on low flows in opposition to the flow through said duct and to open on all high flows, and comprising a hollow chamber body, a weighted ball, a tapered valve seat co-acting with said ball, and adjusting means mounted on said body and controlling the upward limit of travel of said ball; substantially as and for the purposes described.

6. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured and mounted on said mechanism within said casing; a weighted automatic throttling device regulating the flow through said by-pass duct, arranged to close on low flows in opposition to the flow through said duct and to open on all high flows, and comprising a hollow chamber body, a weighted ball, a tapered valve seat co-acting with said ball, and adjusting means mounted on said body and controlling the upward limit of travel of said ball; a secondary by-pass duct adapted to pass around said mechanism a further portion of the liquid to be measured; and a secondary calibrating valve regulating the relative rate of flow through said secondary by-pass duct as compared with the rate of flow through said mechanism; substantially as and for the purpose described.

7. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured and mounted on said mechanism within said casing; and a weighted automatic throttling device regulating the flow through said by-pass duct, arranged to close on low flows in opposition to the flow through said duct, arranged to partially restrict the flow through said duct on high flows, arranged to have maximum opening at a flow between said low flows and said high flows, and comprising a hollow chamber body, a weighted ball, a tapered valve seat co-acting with said ball, and adjusting means mounted on said body and controlling the upward limit of travel of said ball; substantially as and for the purpose described.

8. In a liquid meter a casing provided with a liquid inlet and liquid outlet; a semi-positive liquid operated measuring mechanism interposed between said inlet and said outlet; a registering indicator; means whereby said indicator is operatively connected to and operated by said mechanism; a by-pass duct adapted to pass around said mechanism a portion of the liquid to be measured and mounted on said mechanism within said casing; and a weighted automatic throttling device regulating the flow through said by-pass duct, arranged to close on low flows in opposition to the flow through said duct, arranged to partially restrict the flow through said duct on high flows, arranged to have maximum opening at a flow between said low flows and said high flows, and comprising a hollow chamber body, a weighted ball, a tapered valve seat removably mounted within said body and supporting said ball in its lower positions of opening, and means on said body controlling the upward limit of travel of said ball; substantially as and for the purpose described.

ROBERT S. BASSETT.